United States Patent
Browne et al.

(10) Patent No.: US 9,459,796 B2
(45) Date of Patent: *Oct. 4, 2016

(54) ORDERING LOGICAL UNITS IN A SUBGROUP OF A CONSISTENCY GROUP

(71) Applicant: International Business Machines Corporation, Armonk, NY (US)

(72) Inventors: Michael E. Browne, Staatsburg, NY (US); Nancy J. Finn, Stormville, NY (US); Christina A. Lara, Tucson, AZ (US); Maria R. Ward, Pflugervill, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/501,528

(22) Filed: Sep. 30, 2014

(65) Prior Publication Data

US 2015/0324258 A1 Nov. 12, 2015

Related U.S. Application Data

(63) Continuation of application No. 14/274,876, filed on May 12, 2014.

(51) Int. Cl.
G06F 3/06 (2006.01)
G06F 11/20 (2006.01)

(52) U.S. Cl.
CPC .............. *G06F 3/06* (2013.01); *G06F 3/0619* (2013.01); *G06F 3/0644* (2013.01); *G06F 3/0683* (2013.01); *G06F 11/20* (2013.01); *G06F 11/201* (2013.01); *G06F 11/2064* (2013.01); *G06F 2201/85* (2013.01)

(58) Field of Classification Search
USPC ....................................................... 714/6.2
See application file for complete search history.

(56) References Cited

U.S. PATENT DOCUMENTS

| | | | | |
|---|---|---|---|---|
| 5,440,737 A * | 8/1995 | Uchinuma | ............ | G06F 3/0601 |
| 6,725,332 B2 * | 4/2004 | Leenstra | ................. | G06F 13/18 710/40 |
| 7,278,049 B2 * | 10/2007 | Bartfai | ................ | G06F 11/2064 714/6.3 |
| 7,337,194 B2 * | 2/2008 | Goyal | ................. | G06F 11/2074 |
| 2007/0016822 A1 * | 1/2007 | Rao | ........................ | G06F 9/5061 714/4.11 |
| 2007/0156983 A1 * | 7/2007 | Kern | .................... | G06F 11/2064 711/162 |
| 2008/0059734 A1 * | 3/2008 | Mizuno | ............... | G06F 11/1469 711/162 |
| 2008/0126857 A1 * | 5/2008 | Basham | .............. | G06F 11/3466 714/25 |
| 2009/0006789 A1 * | 1/2009 | LaFrese | .............. | G06F 11/2074 711/156 |
| 2009/0222631 A1 * | 9/2009 | Sugiura | .................. | G06F 3/0605 711/161 |
| 2011/0153964 A1 * | 6/2011 | Browne | .............. | G06F 11/2064 711/162 |

OTHER PUBLICATIONS

U.S. Appl. No. 14/274,876, filed May 11, 2014.
U.S. Appl. No. 14/501,528, filed Sep. 30, 2014.
List of IBM Patents or Patent Applications Treated as Related—Date Filed: Sep. 30, 2014; 1 page.
List of IBM Patents or Patent Applications Treated as Related—Date Filed: May 13, 2016; 2 pages.

* cited by examiner

*Primary Examiner* — Kamini Patel
(74) *Attorney, Agent, or Firm* — Cantor Colburn LLP; Steven Chiu

(57) ABSTRACT

Embodiments relate to method and computer program products which prioritize the logical units in a subgroup. Thereafter, in case of abnormal operation of the process for copying the consistency group from primary storage to secondary storage, low priority logical units of the subgroups of the consistency group are not copied from primary storage to secondary storage.

16 Claims, 5 Drawing Sheets

| Consistency Group ID | Subgroup ID | Logical Unit ID | Priority |
|---|---|---|---|
| 1 | 1 | 1 | 3 |
| 1 | 1 | 2 | 2 |
| 1 | 1 | 3 | 4 |
| 1 | 1 | 4 | 1 |
| 1 | 2 | 1 | 2 |
| 1 | 2 | 2 | 1 |
| 1 | 2 | 3 | 3 |

FIG. 3

ORDERING LOGICAL UNITS IN A SUBGROUP OF A CONSISTENCY GROUP

This application is a continuation application of the legally related U.S. Ser. No. 14/274,876 filed May 12, 2014, the contents of which are incorporated by reference herein in their entirety.

BACKGROUND

The present invention relates to maintaining consistency between primary storage and secondary storage when there is a deterioration of the disaster recovery link.

Disaster recovery systems typically address a sudden catastrophic failure at a single point in time. To assist in recovery of data, a copy of data may be provided at a remote location. Such dual or shadow copies are typically made as the application system is writing new data to a primary storage device. Different copy technologies well known to those skilled in the art may be used for maintaining remote copies of data at a secondary site.

In data mirroring systems, data is maintained in volume pairs. A volume pair is comprised of a volume in a primary storage device and a corresponding volume in a secondary storage device that includes an identical copy of the data maintained in the primary volume. Primary and secondary storage controllers may be used to control access to the primary and secondary storage devices. The integrity of data updates is related to ensuring that updates are done at the secondary volumes in the volume pair in the same order as they were done on the primary volume.

In many application programs, such as database systems, certain writes cannot occur unless a previous write occurred; otherwise the data integrity would be jeopardized. Such a data write whose integrity is dependent on the occurrence of a previous data write is known as a dependent write. For instance, if a customer opens an account, deposits $400, and then withdraws $300, the withdrawal update to the system is dependent on the occurrence of the other writes, the opening of the account and the deposit. When such dependent transactions are copied from the primary volumes to secondary volumes, the transaction order must be maintained to maintain the integrity of the dependent write operation.

Volumes in the primary and secondary storages are consistent when all writes have been transferred in their logical order, i.e., all dependent writes transferred first before the writes dependent thereon. A consistency group is a collection of updates to the primary volumes such that dependent writes are secured in a consistent manner. A consistency group has a consistency time for all data writes in a consistency group having a time stamp equal or earlier than the consistency time stamp. For instance, in the banking example, this means that the withdrawal transaction is in the same consistency group as the deposit or in a later group; the withdrawal cannot be in an earlier consistency group. The consistency time is the latest time to which the system guarantees that updates to the secondary volumes are consistent. Consistency groups maintain data consistency across volumes and storage devices. Thus, when data is recovered from the secondary volumes, the recovered data will be consistent. For instance, if a failure occurs, the deposit will be written to the secondary volume before the withdrawal. Thus, when data is recovered from the secondary volumes, the recovered data will be consistent.

Consistency groups are formed within a session. All volume pairs assigned to a session will have their updates maintained in the same consistency group. Thus, the sessions are used to determine the volumes that will be grouped together in a consistency group.

SUMMARY

Embodiments include methods for ordering logical units in a subgroup of a consistency group. The method includes defining a primary storage consistency group in a primary storage comprising one or more subgroups that each include a first grouping of logical units and defining a secondary storage consistency group in a secondary storage comprising one or more subgroups that each include a second grouping of logical units, updates to the primary storage consistency group are copied to the secondary storage consistency group in the same order they were made to the primary storage consistency group. The method also includes copying, by a computer processor, the primary storage consistency group to the corresponding secondary storage consistency group, monitoring one or more usage characteristics of each of the first grouping of logical units in the primary storage consistency group, and assigning a priority to each of the first grouping of logical units in the primary storage consistency group. The method further includes detecting an abnormal condition in a process for copying the primary storage consistency group from the primary storage to the secondary storage consistency group in the secondary storage, the abnormal condition preventing the primary storage consistency group from being copied in a timely manner to the secondary storage consistency group. Based on detection of the abnormal condition, the method includes removing one or more of the first grouping of logical units in the primary storage consistency group from the process for copying the primary storage consistency group from the primary storage to the secondary storage consistency group in the secondary storage, wherein the one or more of the first grouping of logical units to be removed is based on the priority assigned to the one or more of the first grouping of logical units.

Embodiments also include a computer program product for ordering logical units in a subgroup of a consistency group, the computer program product including a tangible storage medium readable by a processing circuit and storing instructions for execution by the processing circuit for performing a method. The method includes defining a primary storage consistency group in a primary storage comprising one or more subgroups that each include a first grouping of logical units and defining a secondary storage consistency group in a secondary storage comprising of one or more subgroups that each include a second grouping of logical units, updates to the primary storage consistency group are copied to the secondary storage consistency group in the same order they were made to the primary storage consistency group. The method also includes copying, by a computer processor, the primary storage consistency group to the corresponding secondary storage consistency group, monitoring one or more usage characteristics of each of the first grouping of logical units in the primary storage consistency group, and assigning a priority to each of the first grouping of logical units in the primary storage consistency group. The method further includes detecting an abnormal condition in a process for copying the primary storage consistency group from the primary storage to the secondary storage consistency group in the secondary storage, the abnormal condition preventing the primary storage consistency group from being copied in a timely manner to the secondary storage consistency group. Based on detecting of the abnormal condition, the method includes removing one or more of the first grouping of logical units in the primary storage consistency group from the process for copying the primary storage consistency group from the primary storage to the secondary storage consistency group in the secondary storage, wherein the one or more of the first grouping of logical units to be removed is based on the priority assigned to the one or more of the first grouping of logical units.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

FIG. 3 depicts a priority table for tracking the priority of the logical units of subgroups in the consistency group in accordance with an exemplary embodiment;

DETAILED DESCRIPTION

Figure 1:
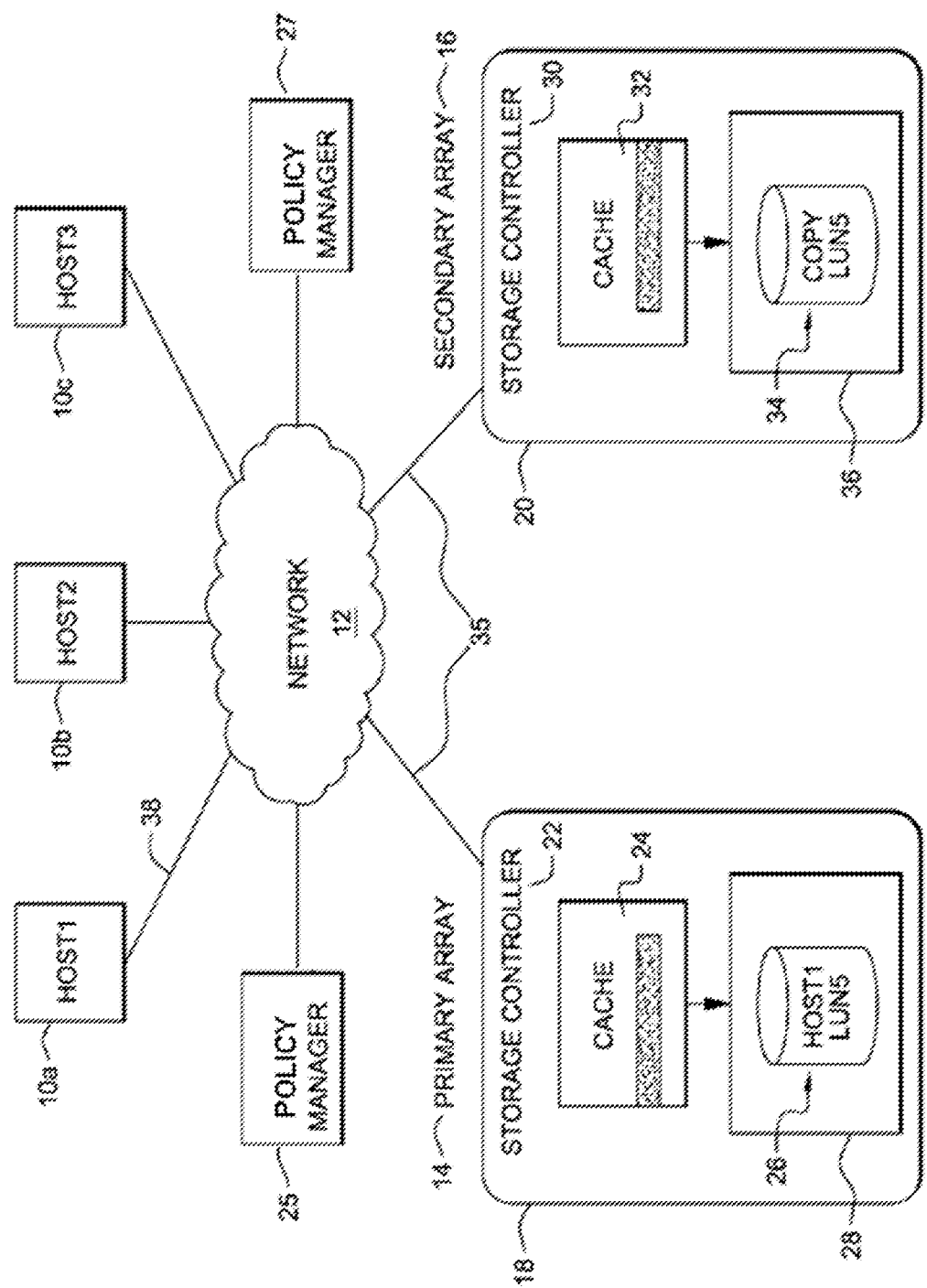
FIG. 1 depicts a block diagram of a network computing environment in accordance with an exemplary embodiment.

Referring to the drawings in more detail, and particularly referring to FIG. 1, there is shown a network computing environment in accordance with an exemplary embodiment. A plurality of computers or hosts 10a, 10b and 10c are connected by links 38 to network 12 and then by link 35 to a primary array 14 of storage systems. The network 12 may be any known network such as a SAN (storage area network), LAN (local area network), Internet, intranet, etc. One of the storage systems 18 that make up the primary array 14 is shown in FIG. 1. The network further includes a secondary array 16 of storage systems, one of which is storage system 20. Secondary array 16 may also be connected to network 12 by link 35. Depending on the architecture of the network computing environment, secondary array 16 may also be linked to hosts 10a, 10b and 10c. Storage systems 18, 20 are representative of storage systems in primary array 14 and second array 16, respectively.

In exemplary embodiments, the storage system 18 includes a storage controller 22 which manages the input/output of access to volumes 26, also be referred to as logical unit (LUN). One such volume is shown in storage system 18 as LUN5. Storage controller 22 also copies data to a corresponding secondary storage controller 30 in storage system 20 via links 35 and network 12. Storage controller 30 stores the data in volumes 34, one of which is shown as LUN5. It should be understood that primary array 14 and secondary array 16 may be close by or may be separated by hundreds or thousands of miles. Preferably secondary array 16 is remote from primary array 14 which facilitates the recovery of data in the event of an event which may shut down or destroy hosts 10a, 10b and 10c and primary array 14.

In exemplary embodiments, the storage system 18 may further include a cache 24. In operation, a write block that comes in to storage system 18 is sent to cache 24 by storage controller 22 which is then written to an appropriate volume in volumes 26. Storage system 20 similarly has cache 32 for performing the same function as cache 24. The volumes 26 in storage system 18 may be defined by a system administrator, the storage controller or a predetermined protocol into one or more consistency groups. One such consistency group 28 is shown in storage system 18. There may be several consistency groups in each storage system. Storage system 20 has a corresponding consistency group 36. Any updates to consistency group 28 are copied to consistency group 36. Each volume 26 in consistency group 28 forms a replication pair with a corresponding volume 34 in consistency group 36.

Figure 2:
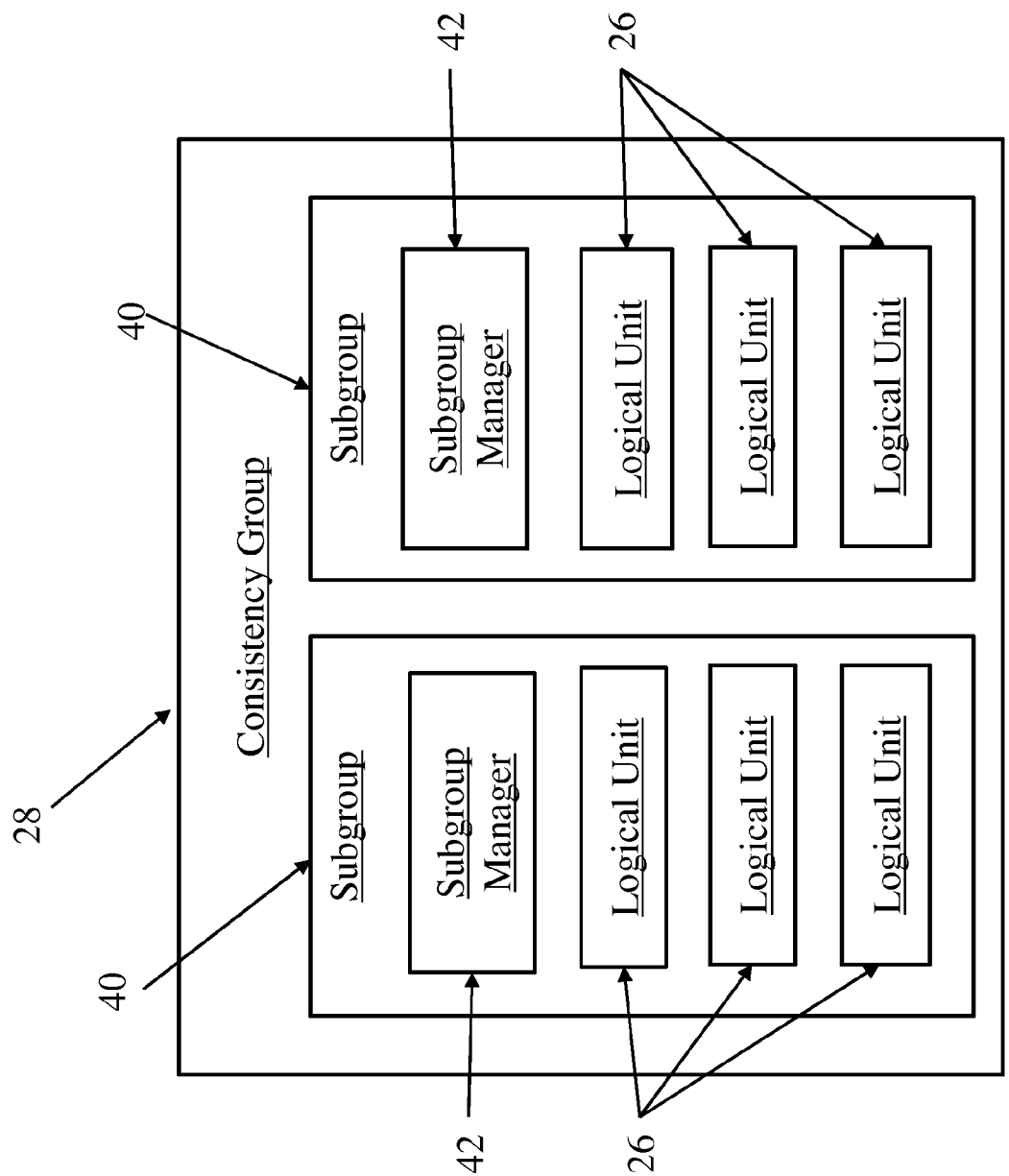
FIG. 2 depicts a block diagram of a consistency group in accordance with an exemplary embodiment.

Referring now to FIG. 2, consistency group 28 is shown in more detail. As illustrated, the consistency group 28 is divided into subgroups 40. In exemplary embodiments, the subgroups 40 comprise database areas of the consistency group 28 and their associated volumes 26. In exemplary embodiments, each of the subgroups 40 includes a subgroup manager 42 that tracks the usage information for each of the volumes, or logical units, 26 of the subgroup 40. In exemplary embodiments, the usage information may include, but is not limited to, the frequency of reads and writes to each of the logical units 26. In exemplary embodiments, a subgroup manager 42 monitors the usage of the logical units 26 within the subgroup 40 and is used to gauge which logical units 26 can be dropped based on usage. As used herein, being dropped means that the logical unit is no longer being replicated from the primary array to the secondary array.

In exemplary embodiments, a policy manager 25, 27 are configured to prioritize individual logical units 26 within a subgroup 40 to be stopped, or taken out of replication mode, which allows for a subgroup 40 within a consistency group 28 to continue running, if that subgroup 40 starts falling behind. In exemplary embodiments, the logical units 26 can be prioritized to be taken out of replication based the usage characteristics of the logical units 26 upon the detection of an abnormal condition by the policy manager 25, 27. In exemplary embodiments, the abnormal condition is a reduced capacity to copy the entire consistency group from primary storage to the corresponding consistency group in secondary storage. The abnormal condition may be detected by an amount of cache utilization, a reduction in link bandwidth rates or numbers of writes in arrears, or the like.

In exemplary embodiments, the policy manager 25, 27 receives the usage characteristics of the logical units 26 from the subgroup managers 42 and uses the usage characteristics to prioritize individual logical units 26 within a subgroup 40. The policy manager 25, 27 may prioritize the least used logical units 26 within a subgroup 40 or the most used logical units 26 within a subgroup 40. In exemplary embodiments, the prioritization of the logical units 26 may also be used by the policy manager 25, 27 to determine the order in which to reintroduce used logical units 26. In exemplary embodiments, the policy manager 25, 27 may also base the prioritization of the logical units on the available bandwidth capacity between the primary array 14 and the secondary array 16.

Referring now to FIG. 3, a priority table for tracking the priority of the logical units of subgroups across one or more consistency group in accordance with an exemplary embodiment is shown. In exemplary embodiments, the policy manager uses the priority table to track the logical units associated with each subgroup of a consistency group and to assign a priority to each of the logical units. The priority assigned by the policy manager can be based on the usage characteristics of the logical units and bandwidth capacity between the primary array and the secondary array. In exemplary embodiments, separate priority tables may be used for each consistency group and/or each subgroup or a single priority table, as illustrated, may be used to track the priority of the logical units.

Continuing with reference to FIGS. 1 and 2, in exemplary embodiments, once a logical unit 26 of a subgroup 40 is dropped, the subgroup 40 will be managed and marked as degraded by the policy manager 25, 27 until the logical units 26 can be recovered and reintroduced into the subgroup 40. In exemplary embodiments, the logical units 26 can be recovered and reintroduced into the subgroup 40 when the condition causing the disruption in communications between the primary array 14 and the secondary array 16 improves. For example, once the bandwidth (between the primary array 14 and the secondary array 16) improves.

In exemplary embodiments, while a subgroup 40 is in a degraded mode it is not being kept up to date, but it will continue to be monitored by the subgroup manager 42. The subgroup manager 42 will monitor how far behind the subgroup 40 gets, minimizing the impact of recovery when logical units 26 have to be recovered.

In exemplary embodiments, removing only low priority logical units 26 allows the replication of the higher priority logical units 26 to continue when there is a slow down on the transfer of data or when a replication a policy starts getting behind. As a result, the probability of a failure of the entire replication process can be greatly reduced. For example, consider a network computing environment operating with a replication policy that starts falling behind within one subgroup; as a result the entire consistency group falls behind. Using currently available techniques, the entire consistency group would be dropped. However, using the embodiments described above, instead of stopping replication completely and risking potential data loss, only the low priority logical units within the consistency group or subgroups are dropped. In exemplary embodiments, the priority logical units are determined by a policy manager based on the usage characteristics of the logical units. For example, the logical units that are being least used may have the lowest priority.

Figure 4:
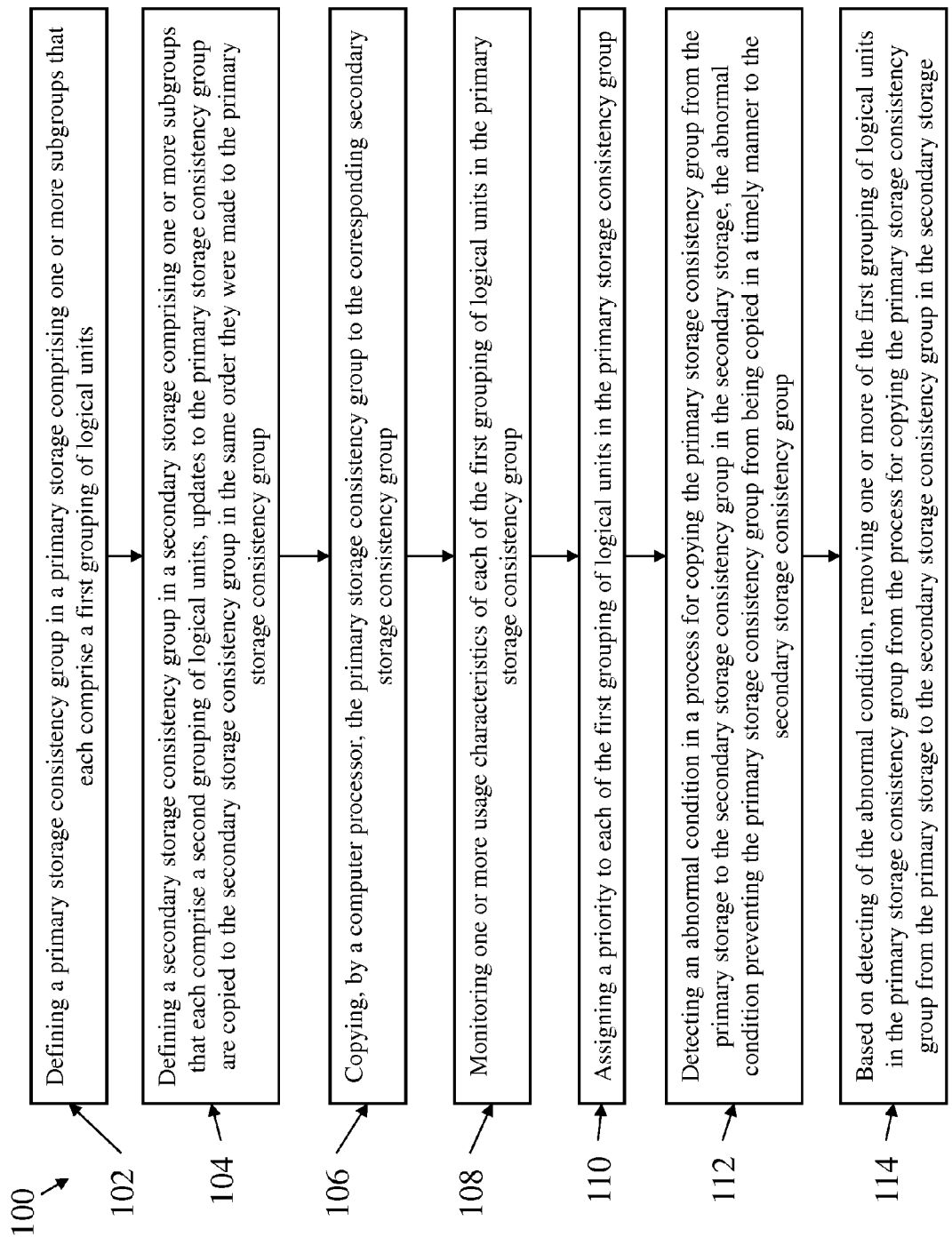
FIG. 4 depicts a block diagrams illustration a method for ordering logical units in a subgroup of a consistency group according an exemplary embodiment.

Referring now to FIG. 4 a block diagram illustrating a method 100 for ordering logical units in a subgroup of a consistency group in accordance with an exemplary embodiment is shown. As shown at block 102, the method 100 includes defining a primary storage consistency group in a primary storage comprising one or more subgroups that each comprises a first grouping of logical units. Next, the method 100 includes defining a secondary storage consistency group in a secondary storage comprising one or more subgroups that each comprise a second grouping of logical units, updates to the primary storage consistency group are copied to the secondary storage consistency group in the same order they were made to the primary storage consistency group, as shown at block 104. As shown at block 106, the method 100 includes copying, by a computer processor, the primary storage consistency group to the corresponding secondary storage consistency group. Next, the method 100 includes monitoring one or more usage characteristics of each of the first grouping of logical units in the primary storage consistency group, as shown at block 108.

Continuing with reference to FIG. 4, as shown at block 110, the method 100 includes assigning a priority to each of the first grouping of logical units in the primary storage consistency group. Next, the method 100 includes detecting an abnormal condition in a process for copying the primary storage consistency group from the primary storage to the secondary storage consistency group in the secondary storage, the abnormal condition preventing the primary storage consistency group from being copied in a timely manner to the secondary storage consistency group, as shown at block 112. In exemplary embodiments, the detection of the abnormal condition is used to predict potential failure of the consistency group before the failure occurs. Based on detecting of the abnormal condition, the method 100 includes removing one or more of the first grouping of logical units in the primary storage consistency group from the process for copying the primary storage consistency group from the primary storage to the secondary storage consistency group in the secondary storage, wherein the one or more of the first grouping of logical units to be removed is based on the priority assigned to the one or more of the first grouping of logical units, as shown at block 114.

In exemplary embodiments, the priority assigned to each of the first grouping of logical units in the primary storage consistency group is based on the one or more usage characteristics of each of the first grouping of logical units in the primary storage consistency group. In exemplary embodiments, the one or more usage characteristics of each of the first grouping of logical units in the primary storage consistency group a frequency of writes to each of the first grouping of logical units in the primary storage consistency group. In one embodiment, the priority assigned to each of the first grouping of logical units in the primary storage consistency group can be positively correlated with the frequency of writes to each of the first grouping of logical units in the primary storage consistency group. In another embodiment, the priority assigned to each of the first grouping of logical units in the primary storage consistency group may be inversely related to the frequency of writes to each of the first grouping of logical units in the primary storage consistency group. In exemplary embodiments, the abnormal condition is a reduced capacity to copy the primary storage consistency group from the primary storage to the secondary storage consistency group in the secondary storage. For example, a reduction in available bandwidth between the primary storage and the secondary storage. In one embodiment, the abnormal condition may be detected by an amount of cache utilization, a reduction in link bandwidth rates or numbers of writes in arrears. In exemplary embodiments, an increase in the number of recoverable link errors or protocol time out near misses can also be used as an indicator of an abnormal condition.

In exemplary embodiments, the priority assigned to each of the first grouping of logical units in the primary storage consistency group is based on the one or more usage characteristics of each of the first grouping of logical units in the primary storage consistency group, which change over time. For example, consider a subgroup that is written to actively on the first three days of the month and not used often after that. The logical units of such a group can have their priority lowered on day four and then raised back up on the last day of the month to prepare for month-end closing activities.

Figure 5:
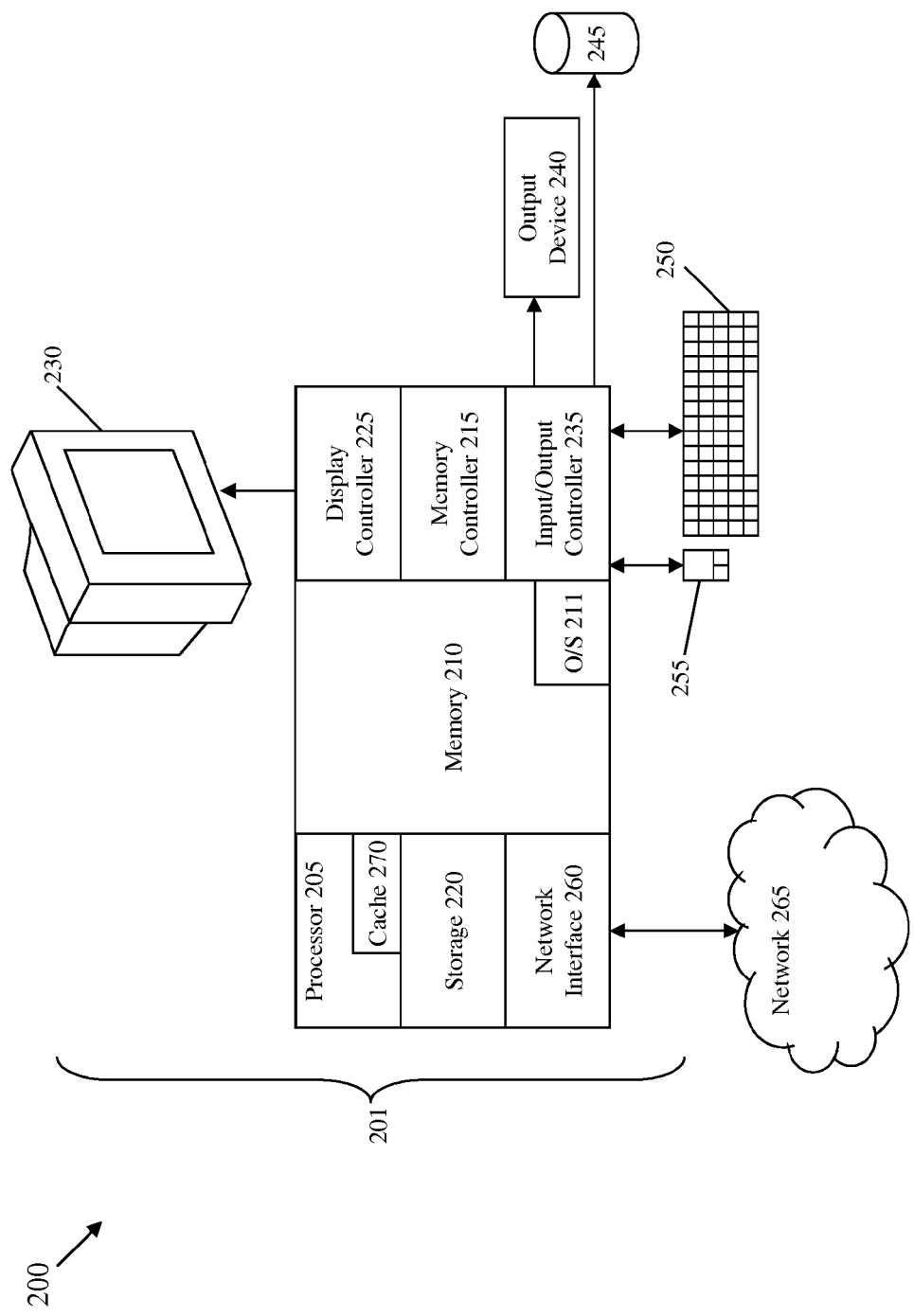
FIG. 5 depicts a block diagram of a computing system in accordance with an exemplary embodiment.

FIG. 5 illustrates a block diagram of an exemplary computer system 200 for use with the teachings herein. The methods described herein can be implemented in hardware software (e.g., firmware), or a combination thereof. In an exemplary embodiment, the methods described herein are implemented in hardware, and is part of the microprocessor of a special or general-purpose digital computer, such as a personal computer, workstation, minicomputer, or mainframe computer. The system 200 therefore includes general-purpose computer 201.

In an exemplary embodiment, in terms of hardware architecture, as shown in FIG. 5, the computer 201 includes a processor 205, memory 210 coupled via a memory controller 215, a storage device 220, and one or more input and/or output (I/O) devices 240, 245 (or peripherals) that are communicatively coupled via a local input/output controller 235. The input/output controller 235 can be, for example, but not limited to, one or more buses or other wired or wireless connections, as is known in the art. The input/output controller 235 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The storage device 220 may include one or more hard disk drives (HDD), solid state drives (SSD), or any other suitable form of storage.

The processor 205 is a computing device for executing hardware instructions or software, particularly that stored in memory 210. The processor 205 can be any custom made or commercially available processor, a central processing unit (CPU), an auxiliary processor among several processors associated with the computer 201, a semiconductor based microprocessor (in the form of a microchip or chip set), a macroprocessor, or generally any device for executing instructions. The processor 205 may include a cache 270, which may be organized as a hierarchy of more cache levels (L1, L2, etc.).

The memory 210 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 210 may incorporate electronic, magnetic, optical, and/or other types of storage media. Note that the memory 210 can have a distributed architecture, where various components are situated remote from one another, but can be accessed by the processor 205.

The instructions in memory 210 may include one or more separate programs, each of which comprises an ordered listing of executable instructions for implementing logical functions. In the example of FIG. 5, the instructions in the memory 210 include a suitable operating system (OS) 211. The operating system 211 essentially controls the execution of other computer programs and provides scheduling, input-output control, file and data management, memory management, and communication control and related services.

In an exemplary embodiment, a conventional keyboard 250 and mouse 255 can be coupled to the input/output controller 235. Other output devices such as the I/O devices 240, 245 may include input devices, for example but not limited to a printer, a scanner, microphone, and the like. Finally, the I/O devices 240, 245 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 200 can further include a display controller 225 coupled to a display 230. In an exemplary embodiment, the system 200 can further include a network interface 260 for coupling to a network 165. The network 265 can be an IP-based network for communication between the computer 201 and any external server, client and the like via a broadband connection. The network 265 transmits and receives data between the computer 201 and external systems. In an exemplary embodiment, network 265 can be a managed IP network administered by a service provider. The network 265 may be implemented in a wireless fashion, e.g., using wireless protocols and technologies, such as Wi-Fi, WiMax, etc. The network 265 can also be a packet-switched network such as a local area network, wide area network, metropolitan area network, Internet network, or other similar type of network environment. The network 265 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 201 is a PC, workstation, intelligent device or the like, the instructions in the memory 210 may further include a basic input output system (BIOS) (omitted for simplicity). The BIOS is a set of essential routines that initialize and test hardware at startup, start the OS 211, and support the transfer of data among the storage devices. The BIOS is stored in ROM so that the BIOS can be executed when the computer 201 is activated.

When the computer 201 is in operation, the processor 205 is configured to execute instructions stored within the memory 210, to communicate data to and from the memory 210, and to generally control operations of the computer 201 pursuant to the instructions.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for ordering logical units in a subgroup of a consistency group, the method comprising;
    defining a primary storage consistency group in a primary storage comprising one or more subgroups that each comprise a first grouping of logical units;
    defining a secondary storage consistency group in a secondary storage comprising one or more subgroups that each comprise a second grouping of logical units, updates to the primary storage consistency group are copied to the secondary storage consistency group in the same order they were made to the primary storage consistency group;
    copying, by a computer processor, the primary storage consistency group to the corresponding secondary storage consistency group;
    monitoring one or more usage characteristics of each of the first grouping of logical units in the primary storage consistency group;
    assigning a priority to each of the first grouping of logical units in the primary storage consistency group;
    detecting an abnormal condition in a process for copying the primary storage consistency group from the primary storage to the secondary storage consistency group in the secondary storage, wherein the abnormal condition is a reduction in an available bandwidth between the primary storage and the secondary storage that prevents the primary storage consistency group from being copied in a timely manner to the secondary storage consistency group; and based on detecting of the abnormal condition, removing one or more of the first grouping of logical units in the primary storage consistency group from the process for copying the primary storage consistency group from the primary storage to the secondary storage consistency group in the secondary storage, wherein the one or more of the first grouping of logical units to be removed is based on the priority assigned to the one or more of the first grouping of logical units.

2. The method of claim 1, wherein the priority assigned to each of the first grouping of logical units in the primary storage consistency group is based on the one or more usage characteristics of each of the first grouping of logical units in the primary storage consistency group.

3. The method of claim 1, wherein the one or more usage characteristics of each of the first grouping of logical units in the primary storage consistency group comprise a frequency of writes to each of the first grouping of logical units in the primary storage consistency group.

4. The method of claim 3, wherein the priority assigned to each of the first grouping of logical units in the primary storage consistency group is positively correlated with the frequency of writes to each of the first grouping of logical units in the primary storage consistency group.

5. The method of claim 3, wherein the priority assigned to each of the first grouping of logical units in the primary storage consistency group is inversely related to the frequency of writes to each of the first grouping of logical units in the primary storage consistency group.

6. The method of claim 1 wherein the abnormal condition comprises a reduced capacity to copy the primary storage consistency group from the primary storage to the secondary storage consistency group in the secondary storage.

7. The method of claim 1 wherein the abnormal condition may be detected by an amount of cache utilization, a reduction in link bandwidth rates or numbers of writes in arrears.

8. The method of claim 1 further comprising:
    detecting that the process for copying the primary storage consistency group from the primary storage to the secondary storage consistency group in secondary storage is proceeding normally; and
    based on detecting that the process for copying the primary storage consistency group from the primary storage to the secondary storage consistency group in the secondary storage is proceeding normally, reintroducing the one or more of the first grouping of logical units in the primary storage consistency group from the process for copying the primary storage consistency group from the primary storage to the secondary storage consistency group in the secondary storage that were removed; and
    copying the primary storage consistency group from the primary storage to the secondary storage consistency group in the secondary storage.

9. A computer program product for ordering logical units in a subgroup of a consistency group, the computer program product comprising:
    a non-transitory tangible storage medium readable by a processing circuit and storing instructions for execution by the processing circuit for performing a method comprising:
        defining a primary storage consistency group in a primary storage comprising one or more subgroups that each comprise a first grouping of logical units;
        defining a secondary storage consistency group in a secondary storage comprising one or more subgroups that each comprise a second grouping of logical units, updates to the primary storage consistency group are copied to the secondary storage consistency group in the same order they were made to the primary storage consistency group;
        copying, by a computer processor, the primary storage consistency group to the corresponding secondary storage consistency group;
        monitoring one or more usage characteristics of each of the first grouping of logical units in the primary storage consistency group;
        assigning a priority to each of the first grouping of logical units in the primary storage consistency group;
        detecting an abnormal condition in a process for copying the primary storage consistency group from the primary storage to the secondary storage consistency group in the secondary storage, wherein the abnormal condition is a reduction in an available bandwidth between the primary storage and the secondary storage that prevents the primary storage consistency group from being copied in a timely manner to the secondary storage consistency group; and
        based on detecting of the abnormal condition, removing one or more of the first grouping of logical units in the primary storage consistency group from the process for copying the primary storage consistency group from the primary storage to the secondary storage consistency group in the secondary storage, wherein the one or more of the first grouping of logical units to be removed is based on the priority assigned to the one or more of the first grouping of logical units.

10. The computer program product of claim 9, wherein the priority assigned to each of the first grouping of logical units in the primary storage consistency group is based on the one or more usage characteristics of each of the first grouping of logical units in the primary storage consistency group.

11. The computer program product of claim 9, wherein the one or more usage characteristics of each of the first grouping of logical units in the primary storage consistency group comprise a frequency of writes to each of the first grouping of logical units in the primary storage consistency group.

12. The computer program product of claim 11, wherein the priority assigned to each of the first grouping of logical units in the primary storage consistency group is positively correlated with the frequency of writes to each of the first grouping of logical units in the primary storage consistency group.

13. The computer program product of claim 11, wherein the priority assigned to each of the first grouping of logical units in the primary storage consistency group is inversely related to the frequency of writes to each of the first grouping of logical units in the primary storage consistency group.

14. The computer program product of claim 9, wherein the abnormal condition comprises a reduced capacity to copy the primary storage consistency group from the primary storage to the secondary storage consistency group in the secondary storage.

15. The computer program product of claim 9, wherein the abnormal condition may be detected by an amount of cache utilization, a reduction in link bandwidth rates or numbers of writes in arrears.

16. The computer program product of claim 9, further comprising:
- detecting that the process for copying the primary storage consistency group from the primary storage to the secondary storage consistency group in secondary storage is proceeding normally; and
- based on detecting that the process for copying the primary storage consistency group from the primary storage to the secondary storage consistency group in the secondary storage is proceeding normally, reintroducing the one or more of the first grouping of logical units in the primary storage consistency group from the process for copying the primary storage consistency group from the primary storage to the secondary storage consistency group in the secondary storage that were removed; and
- copying the primary storage consistency group from the primary storage to the secondary storage consistency group in the secondary storage.

* * * * *